United States Patent
Xu et al.

(10) Patent No.: US 10,206,093 B2
(45) Date of Patent: Feb. 12, 2019

(54) MANAGING DEVICES WITH SGS INTERFACE IN VLR

(71) Applicant: TELEFONAKTIEBOLAGET LM ERICSSON (PUBL), Stockholm (SE)

(72) Inventors: Zhigang Xu, Plano, TX (US); Pui-Sze Ho, Euless, TX (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/604,176

(22) Filed: May 24, 2017

(65) Prior Publication Data
US 2017/0347257 A1 Nov. 30, 2017

Related U.S. Application Data

(60) Provisional application No. 62/340,830, filed on May 24, 2016.

(51) Int. Cl.
*H04W 8/02* (2009.01)
*H04W 8/24* (2009.01)

(52) U.S. Cl.
CPC ............... *H04W 8/02* (2013.01); *H04W 8/24* (2013.01)

(58) Field of Classification Search
CPC ....... H04W 60/00; H04W 64/00; H04W 8/04; H04W 36/0022; H04W 36/0033; H04W 8/02; H04W 8/24
See application file for complete search history.

(56) References Cited

U.S. PATENT DOCUMENTS

| | | | |
|---|---|---|---|
| 2007/0142031 A1* | 6/2007 | Lee ........................ | H04L 63/08 455/411 |
| 2009/0059829 A1* | 3/2009 | Bachmann ............ | H04W 36/14 370/311 |
| 2010/0098023 A1* | 4/2010 | Aghili ............... | H04W 36/0022 370/331 |
| 2011/0021216 A1* | 1/2011 | Pudney ................... | H04W 4/12 455/466 |
| 2011/0103277 A1* | 5/2011 | Watfa ................ | H04W 36/0022 370/310 |
| 2011/0165898 A1* | 7/2011 | Drevon ................... | H04W 4/12 455/466 |
| 2011/0263274 A1* | 10/2011 | Fox ....................... | H04W 60/00 455/456.2 |
| 2012/0218889 A1* | 8/2012 | Watfa ................... | H04W 60/04 370/230 |

(Continued)

OTHER PUBLICATIONS

3GPP TS 29.118 V13.3.0, 3rd Generation Partnership Project; Technical Specification Group Core Network and Terminals; Mobility Management Entity (MME)—Visitor Location Register (VLR) SGs interface specification (Release 13), Mar. 2016.

*Primary Examiner* — Jean A Gelin

(57) ABSTRACT

A method and a network node device for auditing a Visitor Location Register (VLR) to manage communication device retention. The method comprises, when the age of a communication device's age in the VLR reaches or exceeds a first threshold, triggering a request to a Mobility Management Entity (MME) to notify the VLR of the communication device's activity. The method further comprises receiving a notification from the MME indicating the communication device's activity, and updating the communication device's aging information based on the notification.

21 Claims, 11 Drawing Sheets

(56) References Cited

U.S. PATENT DOCUMENTS

| | | | |
|---|---|---|---|
| 2013/0045738 A1* | 2/2013 | Chen | H04W 76/18 455/433 |
| 2014/0051466 A1* | 2/2014 | Yu | H04W 4/14 455/466 |
| 2014/0287745 A1* | 9/2014 | Edwards | H04W 60/00 455/433 |
| 2016/0100362 A1* | 4/2016 | Palanisamy | H04W 52/0212 370/311 |
| 2016/0105790 A1* | 4/2016 | Shu | H04W 8/06 455/435.1 |
| 2016/0295395 A1* | 10/2016 | Hashmi | H04W 24/02 |
| 2016/0309439 A1* | 10/2016 | Wu | H04W 8/02 |
| 2017/0048758 A1* | 2/2017 | Shu | H04W 8/06 |
| 2017/0078926 A1* | 3/2017 | Zhu | H04W 36/0022 |
| 2017/0188303 A1* | 6/2017 | Bas Sanchez | H04W 52/0216 |
| 2017/0325130 A1* | 11/2017 | Purohit | H04W 36/0005 |
| 2017/0332356 A1* | 11/2017 | Tamura | H04W 68/02 |

* cited by examiner

MANAGING DEVICES WITH SGS INTERFACE IN VLR

TECHNICAL FIELD

Certain embodiments relate, in general, to mobile device management and, more particularly, to managing, in a Visitor Location Register (VLR), mobile devices associated with an SGs interface.

BACKGROUND

For a Visitor Location Register (VLR) to do an attach/detach audit of mobile devices and corresponding VLR space management, the VLR normally uses some timers or timestamps for each subscriber/user equipment (UE) currently registered in the VLR. A subscriber or UE's activity timestamp is updated in the VLR when the subscriber/UE has an activity such as location update, a call, a Short Message Service (SMS), etc. When a subscriber/UE does not have any activity, or does not report any activity for a long time, its activity timestamp in the VLR will become old. That is, the subscriber/UE ages when no activity occurs or is reported to the VLR, and this process is referred to as "aging".

With current wireless technology development, more and more special usage UEs such as Internet of Thing (IoT) UEs are connected to a Mobile Switch Center (MSC)/VLR through an SGs interface. In 3GPP, the SGs interface is an interface between the VLR and a Mobility Management Entity (MME).

Some of these special usage UEs may only use MSC for services such as SMS, and use packet core for other services. Some of these special usage UEs may have very infrequent contact with the VLR/MSC (either through the SGs interface or through a 2G/3G radio interface). For example, these special usage UEs may only do a periodic tracking area update (PTAU) with the MME over a long period of time, such as, an in-vehicle UE in a car parked in an airport parking lot. Based on 3GPP specifications, the MME normally does not notify the VLR when it receives a PTAU. Thus, if an SGs-associated UE only does PTAUs and there are no other VLR/MSC core activities for a long time, its "age" in the VLR will become old. On the other hand, due to VLR space/memory management, VLR may need to delete the older/aging subscribers/UEs to make room for new incoming subscribers/UEs to the VLR.

One problem with existing solutions is that per current 3GPP specifications, e.g. TS 29.118, when a UE is attached for Evolved Packet System (EPS) and non-EPS services, a serving VLR shall stop the implicit detach timer so that a UE is not marked as detached in the serving VLR even if the UE only does PTAU with the MME and there are no activities with its serving MSC for a long time. However, this existing 3GPP solution does not align with the VLR space management when the VLR needs to delete older or aging inactive subscribers/UEs, including the attached ones, to make room for new incoming subscribers/UEs. Also, deletion of an SGs-associated subscriber/UE such as an inactive or stationary aging attached in-vehicle UE would cause such UE to not function properly with the MSC/VLR.

Another problem with the existing solutions is that current 3GPP specifications do not specify any different treatment for SMS-only UEs in terms of Temporary Mobility Subscriber Identity (TMSI) allocation/reallocation. For example, when a serving VLR processes a SGsAP-Location-Update-Request message, the VLR may allocate a new TMSI to the SMS-only UE unnecessarily.

SUMMARY

It is therefore desirable to provide a solution to manage mobile devices in the VLR to manage inactive, aging mobile devices, and particularly, SGs-associated mobile devices, by checking with the MME for activity associated with the SGs-associated mobile device before deleting the mobile device due to inactivity. An advantage of the proposed solution enables the VLR to manage its space properly without incidentally deleting the targeted SGs sub scribers/UEs and without causing a massive volume of messages between MMEs and VLRs. Another advantage is improved VLR space management for subscribers/UEs. For example, the solution enables the VLR to force the subscriber/UE's age update for less active SGs subscribers/UEs either using existing 3GPP defined procedures or a new procedure with configurable message rate control. Another advantage of the solution is that it enables an operator to apply different aging policies to different groups of subscribers/UEs.

According to a first aspect, a method of auditing a Visitor Location Register (VLR) to manage communication device retention is provided. When a communication device's age in the VLR reaches, or exceeds a first threshold, the method comprises triggering a request to a Mobility Management Entity (MME) to notify the VLR of the communication device's activity. The method further comprises receiving a notification from the MME indicating the communication device's activity, and updating the communication device's aging information based on the notification.

According to a second aspect, a Visitor Location Register (VLR) for managing communication device retention configured to communicate with a Mobility Management Entity (MME) via an SGs interface is provided. The VLR comprises processing circuitry comprising a memory and a processor, the memory in communication with the processor, and the memory having instructions that, when executed by the processor, cause the network node to, when a communication device's age in the network node reaches or exceeds an Age-To-Query threshold, trigger a request to the MME to notify the VLR of the communication device's activity. The instruction when executed further cause the VLR to receive a notification from the MME indicating the communication device's activity; and update the communication device's aging information based on the notification.

In a third aspect, a non-transitory computer readable medium is provided. The non-transitory computer readable medium comprises instruction which when executed by a process, cause a network node device to perform the method according to the first aspect, and any of its embodiments.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to help convey the scope of the inventive concept to those skilled in the art. If used, like numbers refer to like elements throughout the description.

Figure 1:
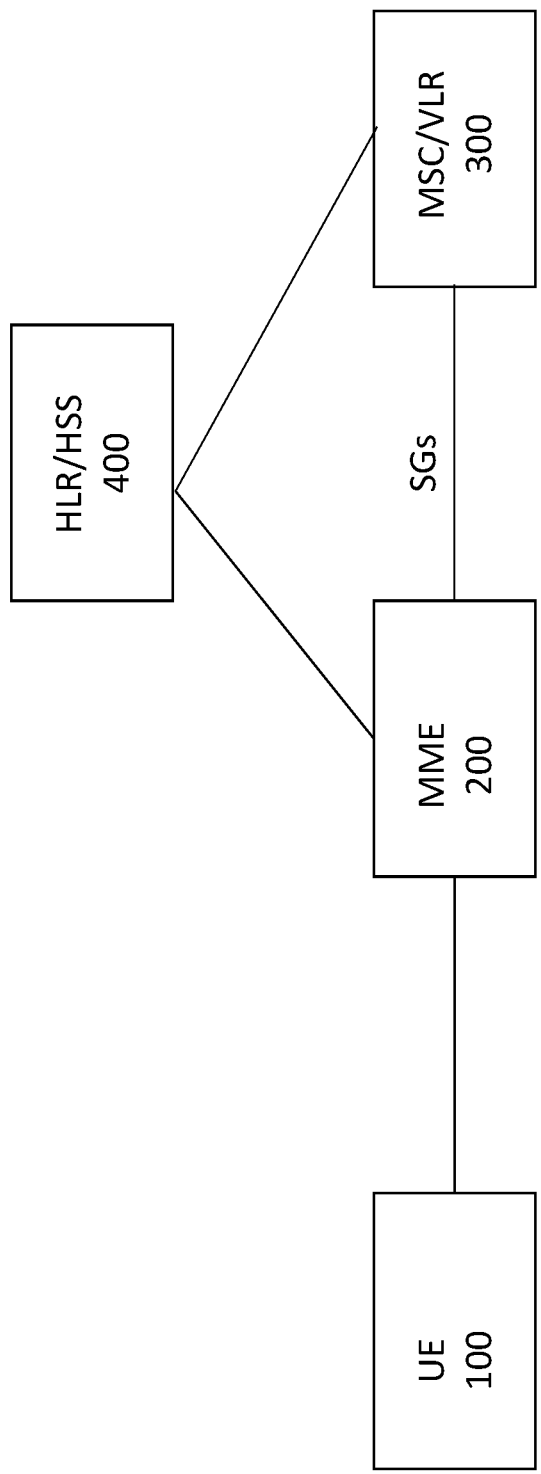
FIG. 1 illustrates a block diagram of a wireless communication system.

FIG. 1 illustrates an embodiment of a wireless communication system. The wireless communication system comprises user equipment (UE) 100, which may be referred to interchangeably, and in a non-limiting way, as a subscriber or UE/subscriber. The UE 100 may be any type of wireless endpoint, mobile station, mobile phone, conventional user equipment, machine type communication (MTC)/machine-to-machine (M2M) UEs, wireless local loop phone, smartphone, user equipment, desktop computer, PDA, cell phone, tablet, laptop, VoIP phone or handset, which is able to wirelessly send and receive data and/or signals to and from a network node in a wireless communication network.

The wireless communication system further comprises an MME 200, an MSC/VLR 300, and a Home Location Register (HLR)/Home Subscriber Server (HSS) 400. The MSC/VLR is depicted as combined functionality, although in some embodiments, the MSC and VLR may be separated. Thus, MSC and VLR may be referred to interchangeably as MSC/VLR, VLR/MSC, or separately as MSC and/or VLR. The UE may be 4G/Long Time Evolution (LTE)-capable and attached to the MME which has an interface to the VLR through the SGs interface 500.

As discussed above, some IoT UEs associated with an SGs interface may have less activities and/or interactions with the VLR/MSC, which leads to continued aging of those UEs in the VLR, and consequentially leads to the deletion of them from the VLR due to VLR space management.

A proposed solution for the aging problem of less active UEs is provided. In the proposed solution, the VLR queries such UEs through the MME before deleting the UEs. The proposed solution provides new configurable control, or run-time calculation, of a querying age threshold and a deleting age threshold, and a new, optional querying message rate. The proposed solution may use defined messages in the existing 3GPP standards between the VLR/MSC and MME in order to avoid interoperability issues between different vendor's VLR/MSC and MME with different standards compliance versions. As an alternative, the solution also proposes that new messages and information elements (IEs) may be used for the VLR to query the UEs through MME and also for the MME to notify the VLR of any UEs' activities. A UE's age is the amount of time since the last activity associated with the UE, i.e. the time elapsed since the last activity. Typically, when there is activity associated with the UE, the VLR resets the UE's age. When no activity associated with the UE is detected, the UE continues to age and the amount of time since the last activity associated with the UE increases.

The proposed solution provides new configurable control, or run-time calculation, of a querying age threshold (Age-To-Query) and a deleting age threshold (Age-To-Delete). The Age-To-Query threshold specifies at which age the VLR/MSC queries the MME for the UE activity. The Age-To-Delete threshold specifies a total minimum age threshold to mark the UE delete-able due to inactivity and no detected interaction with the VLR/MSC. In some embodiments, the values for Age-To-Query and Age-To-Delete for a specific UE can be derived from, e.g., provisioning based on IMSI/IMEI of the UE, default provisioning, or a runtime calculation. Each of these options is discussed in more detail herein.

IMSI/IMEI Based Provisioning/Configuration

In one embodiment, an operator may determine a UE's characteristics, such as, the UE type and service category based on the IMSI or IMEI range in which the UE's IMSI/IMEI falls. Thus, an operator may provision different values of Age-To-Query and Age-To-Delete for different UEs based on IMSI/IMEI range. This is called IMSI/IMEI based provisioning/configuration.

The value of Age-To-Query for any individual UE or set of UEs, e.g. a set of UEs in an IMSI/IMEI range, may depend on various factors including the VLR space requirement and characteristics of the UEs. In an embodiment, if the VLR needs to delete more aging UEs in order to make room for the new incoming subscribers, the value of Age-To-Query/Age-To-Delete values should be smaller so that UEs may be deleted earlier. On the other hand, the value of Age-To-Query/Age-To-Delete may be larger, thus, allowing a UE or set of UEs additional time to age before being deleted.

The Age-To-Query value should be greater than the PTAU timer value for an IMSI/IMEI or IMSI/IMEI range if the PTAU timer value is used as one of the criteria for setting the Age-To-Query value. Further, the corresponding value of Age-To-Delete should be set to, at least, the Age-To-Query value plus at least 2 times the PTAU timer value.

Default Provisioning

In another embodiment, an operator may provide default provisioning in which the Default-Age-To-Query and Default-Age-To-Delete parameters are applied to the UEs by default if:

the targeted UE is not in the IMSI/IMEI based configuration for SGs-associated UEs, the IMSI/IMEI based configuration for SGs-associated UEs does not exist, or the run-time calculation (described below) does not apply to the targeted UE.

Runtime Calculation

As described above in regard to the provisioning of the values for Age-To-Query and Age-To-Delete, these values may depend on the PTAU timer value. On the other hand, within a network, the PTAU timer value may not be a constant for all UEs or within a range of IMSI/IMEI. For example, some IoT UEs may use power saving mode (PSM). Based on 3GPP 23.401 when a UE uses PSM, it shall request an Active Timer value and may also request a Periodic TAU/RAU Timer value during every Attach procedure. The Periodic TAU/RAU Timer value of a specific UE may therefore be different from operator/network-provided broadcast PTAU timer value. Hence, the values for Age-To-Query and Age-To-Delete can be UE dependent and may be required to be derived dynamically during run-time processing.

To better manage Age-To-Delete values and VLR space, in an embodiment of the proposed solution, the MME sends a new UE's specific data such as its timers (e.g. its periodic TAU/RAU Timer and/or the actual time period between two consecutive TAU messages from the UE) for each UE to the VLR. The data may be sent to the VLR in new optional IE(s), e.g., new IEs in an SGsAP-Location-Update-Request message. With the new IE(s), the VLR can then calculate the corresponding Age-To-Query and Age-To-Delete values for each SGs-associated UE during run-time. Other criteria other than a UE's PTAU may be used to derive its Age-To-Query and Age-To-Delete during run-time.

This invention also proposes an alternative method to the above. If the MME does not support sending the new UE's specific data above to the VLR, e.g. in new optional IE(s) in SGsAP-Location-Update-Request message, the VLR can collect its data to determine the UE's specific Age-To-Query and Age-To-Delete. For example, in order to determine the Periodic TAU timer value for each UE and make a decision of the Age-To-Delete value of the targeted UE, the VLR may choose to query a targeted SGs-associated UE for an X number of times consecutively, e.g. querying immediately after receiving incoming UE activity notification for X number of times. Based on analysis by the VLR of the query responses, if the targeted UE shows UE activity through the MME a fixed period of time in most, e.g. more than half, or X/2, of the X number of queries, the VLR may determine the fixed period of time may be its Periodic TAU/RAU value and the corresponding Age-To-Delete may then be derived for this UE from that determination.

In an embodiment, the VLR may use the existing SGs Alert procedure to query the MME. The VLR may audit its database periodically. In an embodiment, the audit period may also configurable. When the VLR, during the audit, determines that an SGs-associated subscriber/UE is inactive for more than its Age-To-Query time value, e.g. based on its age, the VLR may send out a query, e.g. a SGsAP-Alert-Request message to MME, and save an indicator, e.g. a Query indicator, in the VLR to mark that the UE has been queried. Based on existing 3GPP specification, the MME will notify the VLR during a next UE activity, e.g. including PTAU activity, after it receives the SGsAP-Alert-Request message. If the VLR receives such notification from the MME or detects any other activity, such as, an SMS over SGs from the UE, the VLR updates the UE's timestamp, i.e. the VLR resets the UE's age to zero. The VLR also un-marks the Query indicator in the VLR. On the other hand, if the VLR does not receive a notification from MME and does not detect any other activity by the UE, the VLR does not reset the UE's age and lets the UE continue to age. Later, when the VLR recognizes that the UE has been audited, e.g. based on the Query indicator, and when the UE's age, i.e. its inactive time, is equal to or exceeds its corresponding Age-To-Delete value, the VLR marks this UE to be deleteable. A UE marked as delete-able is thus a UE that has been audited, e.g. the MME has been queried regarding the UE's activity, and no subsequent activity has been notified to the VLR or otherwise detected by the VLR, so the UE continues to age until its age reaches or exceeds the Age-To-Delete value.

When a UE is marked as delete-able, the VLR space management may delete this UE from its database when it needs to make space for new incoming subscribers. In another embodiment, the VLR may determine whether to delete a UE based on additional criteria in addition to the delete-able mark, e.g., the UE's age, and whether the UE is roaming or is in its home network, the UE is a regular priority or high priority device, and whether the UE is detached or is an active device. Other criteria associated with the UE or associated with the VLR may be used to further optimizing the VLR UE storage.

In an alternative embodiment, new messages and associated IEs may be used for the VLR to query the UEs through MME and, in response, for the MME to notify the VLR of any UEs' recently occurred activity or next activity, i.e. PTAU. When new messages and IEs are used, the MME may notify the VLR of more information other than the UE's activity. For example, the MME may send a response which contains a timestamp of the UE's activity right after it receives the query, and the VLR can update the UE activity timestamp accordingly when it receives such response message.

In another embodiment, in order to avoid the VLR flooding of such SGsAP-Alert-Request messages or the new SGsAP UE Activity Query Request message to the MMES, the operator may configure the Alert/Query message rate with a configuration parameter, e.g. Query-Msg-Rate-Per-MME, for a corresponding MME in the VLR/MSC. The configuration parameter of Query-Msg-Rate-Per-MME specifies how many of SGsAP-Alert-Request/new SGsAP UE Activity Query Request messages may be sent to an MME within a given time period, e.g. one second. This is an optional feature with a corresponding parameter to improve efficiency in VLRs with large number of SGs-associated UEs for audit. The configuration parameter value may depend on a number of SGs-associated UEs per MME which may be inactive longer than an Age-To-Query value per historical or current data, and may also depend on the how long the audit period is. The principle of setting the value for this parameter is that the audit can be finished within the specified period of the audit cycle and without significant increase of messages between the VLR/MSC and MMES.

Figure 2:
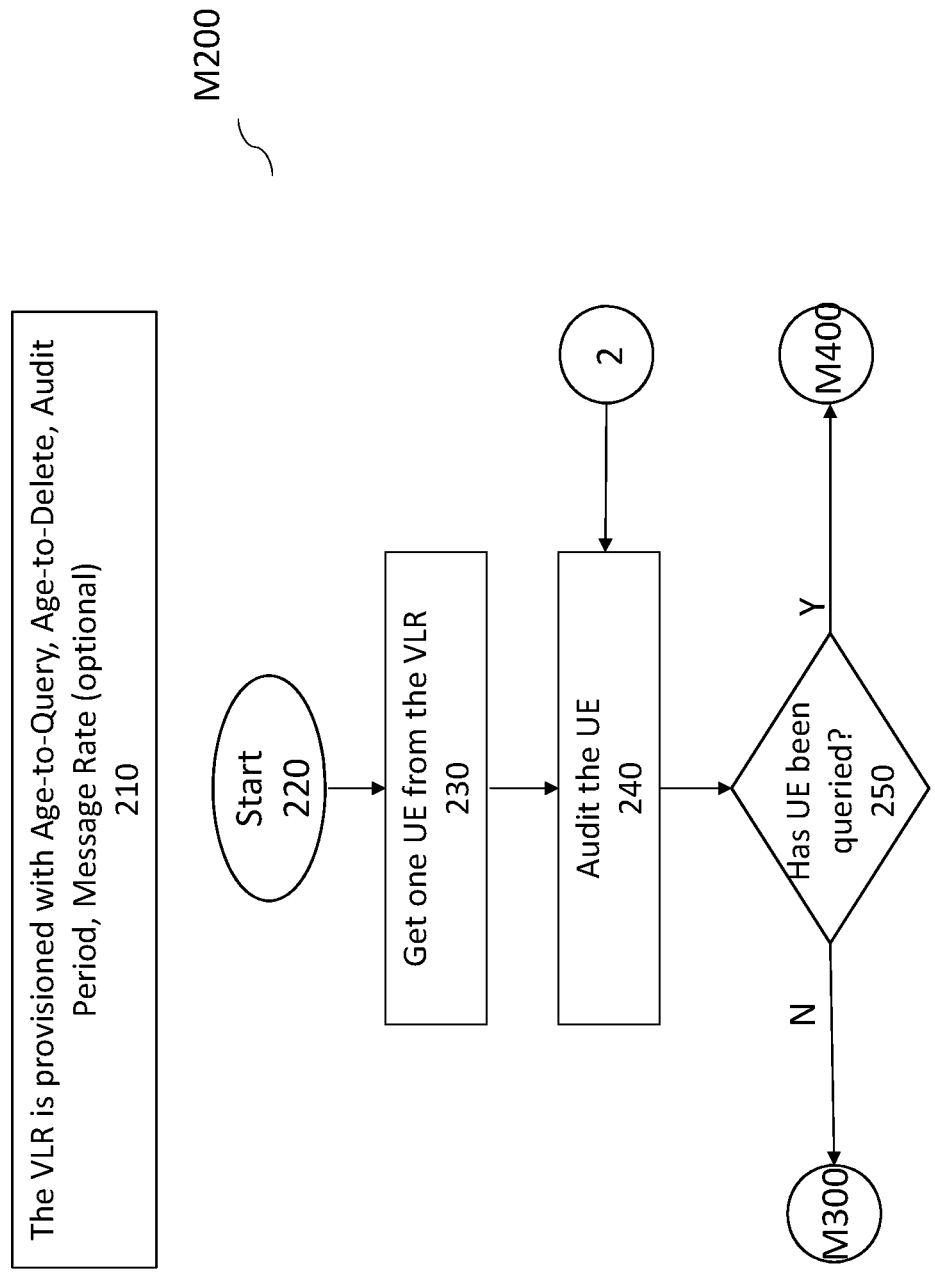
FIG. 2 illustrates an embodiment of a VLR audit according to the proposed solution.

FIG. 2 illustrates a flowchart of method M200 of a VLR audit procedure according to the proposed solution. Before an audit of the SGs-associated UEs is performed, the VLR is provisioned 210 with corresponding parameters, including parameters to define Age-To-Query, Age-To-Delete, audit period, and optionally, a query message rate. At 220, the VLR audit starts. At 230, the VLR selects a UE and at 240, performs the audit of the UE. As part of the audit procedure, at 250, the VLR determines whether the MME has been queried with respect to the UE. The VLR may determine this by checking whether the UE has been marked indicating that the MME has been queried for the UE. If the MME has not been queried for this UE, then the VLR performs the method M300 illustrated in FIG. 3 for querying the MME regarding the UE's activity. If the VLR determines that the UE has been queried, the VLR performs the method M400 illustrated in FIG. 4 for VLR storage management.

Figure 3:
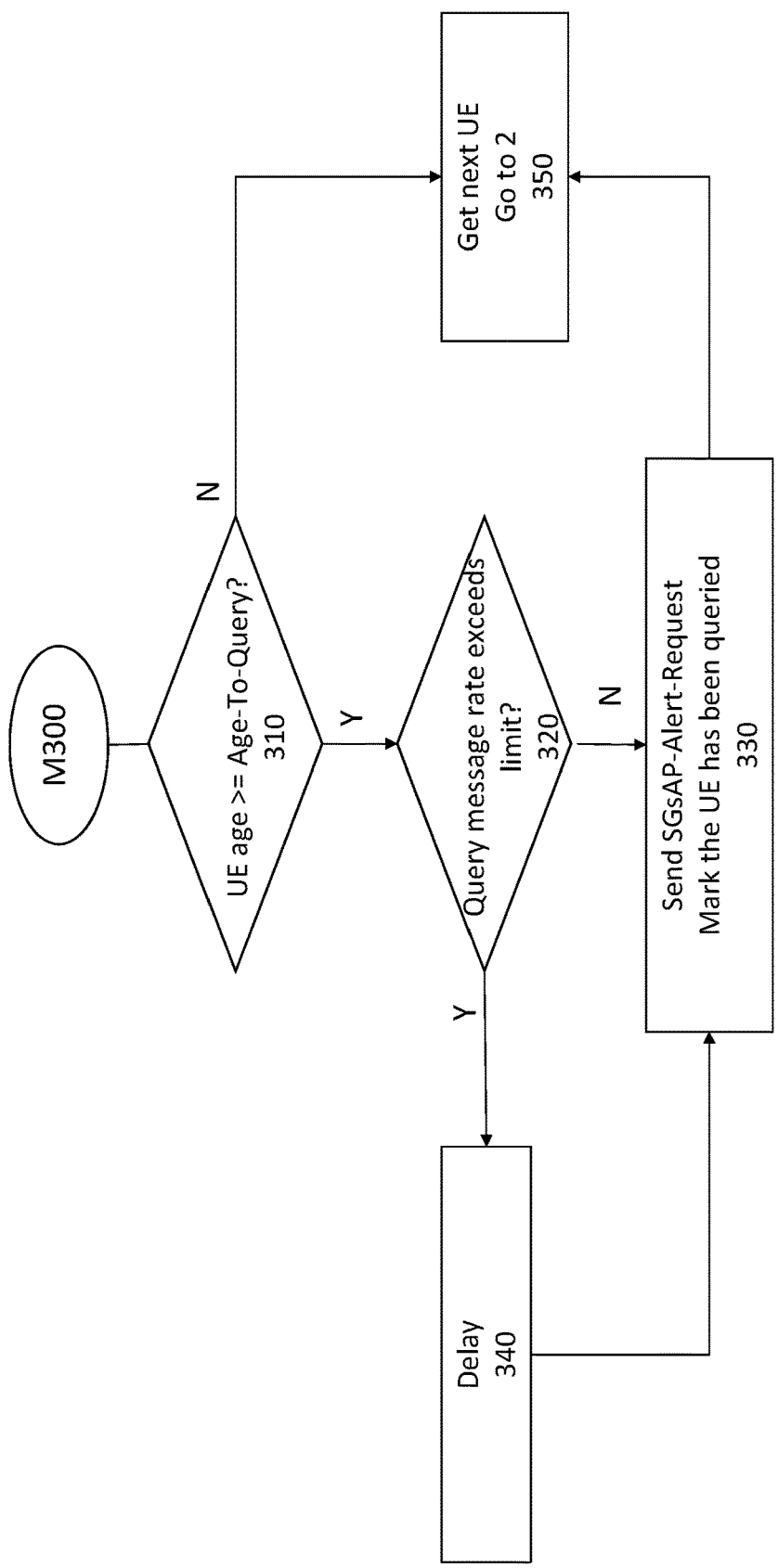
FIG. 3 illustrates a flowchart of a VLR audit query.

FIG. 3 illustrates a flowchart of a method M300 of the VLR audit query to the MME for the UE under audit. At 310, the VLR determines whether the UE's age is equal to or greater than a first threshold value, e.g. an Age-To-Query value, associated with the UE. If the UE's age is not equal to or greater than the first threshold value, no audit is performed for that UE and at 350, the VLR returns to step 240 of FIG. 2 to perform the audit for the next UE. If the UE's age is equal to or greater than the first threshold value associated with the UE, the VLR may, at 320, optionally determine if a query message rate limit is exceeded. If the query message rate parameter has not been configured, the VLR will skip this step and proceed to step 330. If the query message rate parameter is configured and the query message rate value has been exceeded, at 340, the VLR will delay the audit and move to 330 after the delay. When the query message rate parameter is not configured, or when the query message rate parameter is configured and the query message rate has not been exceeded, at 330, this triggers the VLR to send a query to the MME, e.g. SGsAP-Alert Request or a new query message, and mark the UE to indicate that the MME has been queried for that UE, e.g. set the Query indicator for the UE. An embodiment of a signaling exchange is described further in FIG. 6 below. At 350, the VLR then proceeds to audit the next UE by returning to step 240 of FIG. 2.

Figure 4:
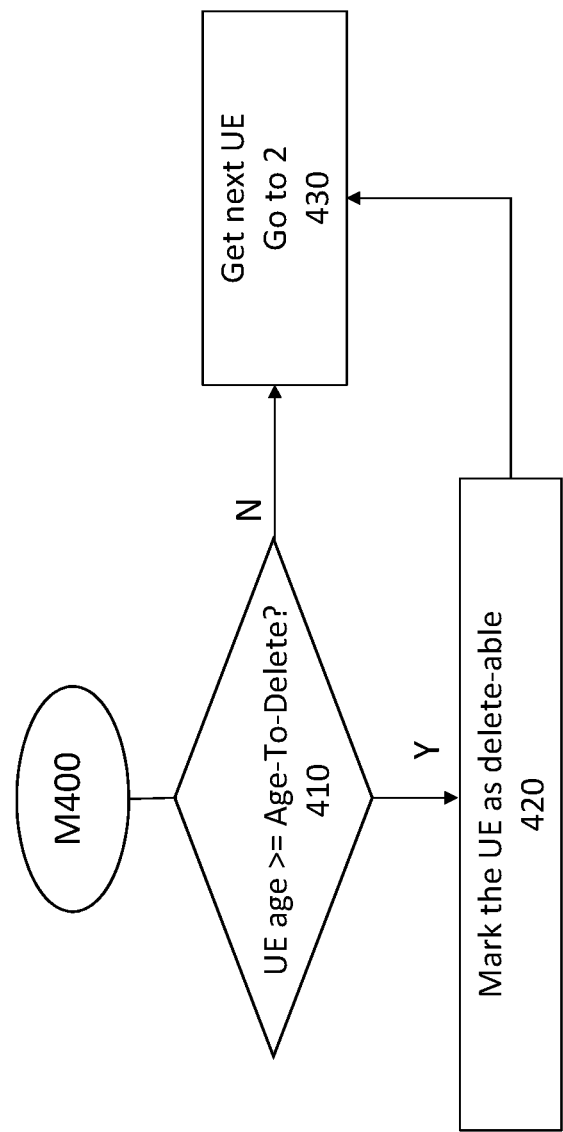
FIG. 4 illustrates a flowchart of a VLR storage management procedure.

FIG. 4 illustrates a flowchart of method M400 of the VLR storage management procedure. In this embodiment, the VLR may have determined, e.g. at step 250 of FIG. 2, that it has already queried the MME for this UE, e.g. by checking the UE's Query indicator. At 410, the VLR determines whether the UE's age is greater than, i.e. exceeds, a second threshold value, i.e. the Age-To-Delete value. If the UE's age is equal to or exceeds the second threshold value, at 420, the VLR marks the UE as delete-able, but does not delete the UE. If the UE's age is not greater than the second threshold value, at 430, the VLR proceed to audit the next UE by returning to step 240 of FIG. 2.

Figure 5:
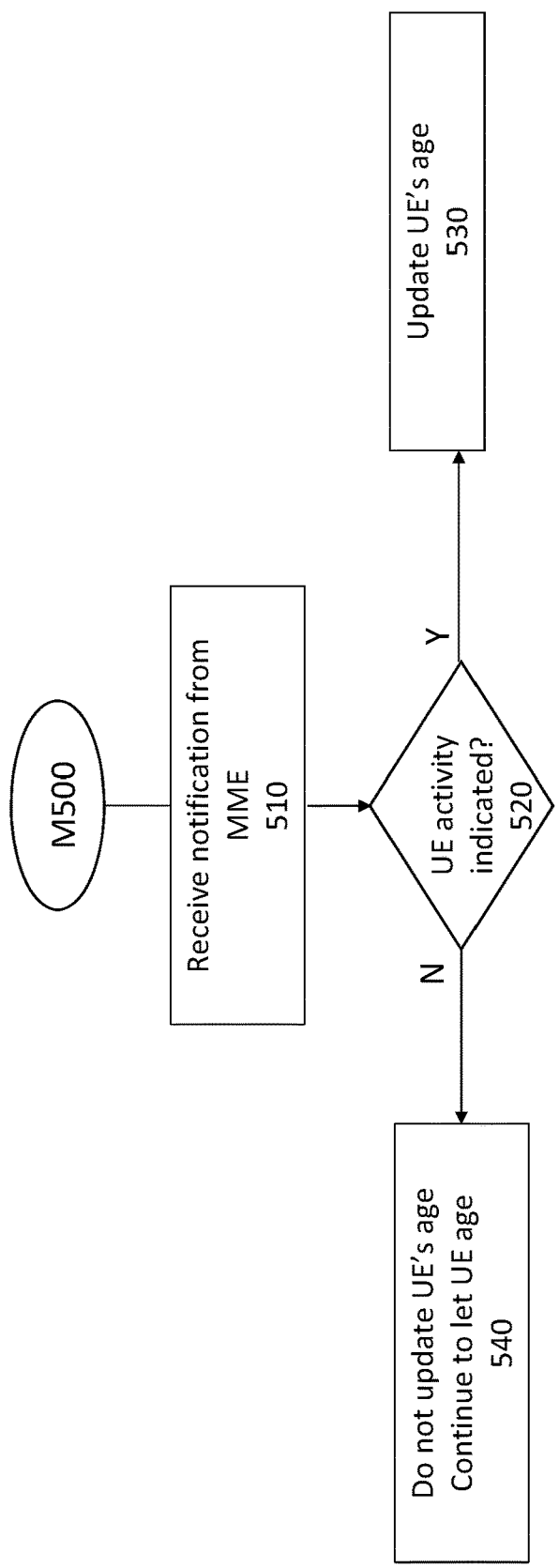
FIG. 5 illustrates a flowchart for a VLR to process a query response or a notification received from an MME.

FIG. 5 illustrates a flowchart for method M500 for a VLR to process a query response or a notification from the MME. In an embodiment, the MME response to a VLR query may be just an acknowledgement of receiving the VLR query request and may not indicate whether a UE has activity or has no activity with the MME. However, a new notification from the MME received many minutes later after the VLR query request indicates there is UE activity. In 510, the VLR receives a notification or query response from the MME in response to the VLR request. At 520, the VLR determines whether UE activity has been indicated in the notification or query response from the MME. When UE activity is indicated, at 530, the VLR updates the UE's age. In an embodiment, the VLR may reset the UE age to zero. In another embodiment, the VLR may update the UE's age to reflect time elapsed since the last activity indicated in the notification from the MME. In other embodiments, the VLR may calculate the UE's age based on other information regarding the UE's activity. When the VLR determines that no activity has been indicated in the notification from the MME, at 540, the VLR does not update the UE's age, and lets the UE continue to age.

Figure 6:
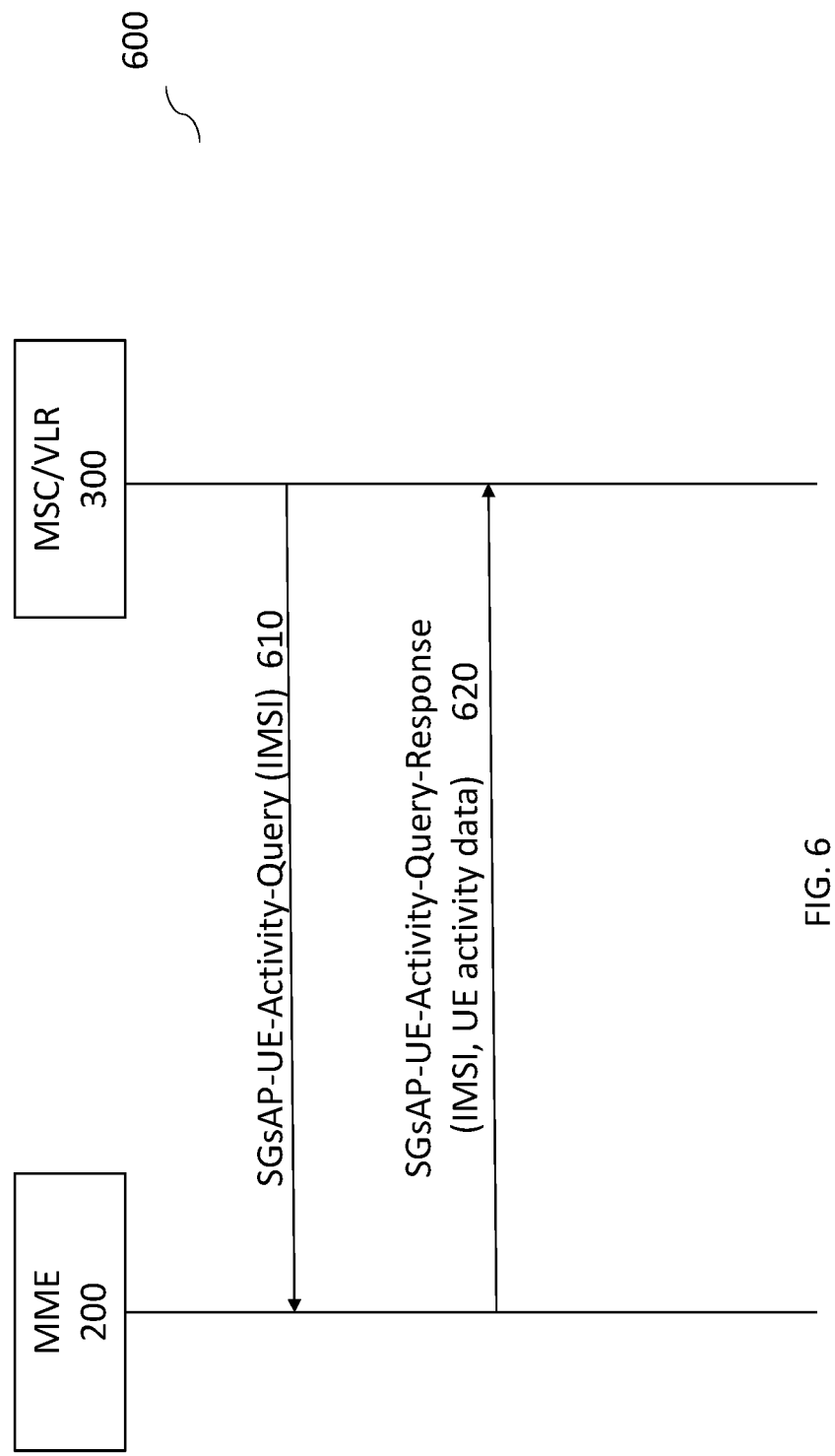
FIG. 6 illustrates a signaling diagram for a VLR query to the MME for an SGs-associated UE using new messages.

FIG. 6 illustrates a signaling diagram 600 for a VLR query to the MME for an SGs-associated UE using new messages. Correspondingly, the messages are transmitted/received between the MME and the MSC/VLR on the SGs interface. In this embodiment, the VLR starts the audit procedure by selecting a UE. At 610, the VLR 300 sends a query to MME 200 using a new SGs message, e.g. an SGsAP-UE-Activity-Query-Request message. The query includes the IMSI of the UE under audit. At 620, the MME 200 returns a query response to the VLR with a new SGs message response, e.g. an SGsAP-UE-Activity-Query-Response. The response includes the IMSI of the UE and other UE data, including at least, the last UE active timestamp indicating the last activity of the UE with the MME. On receipt of the query response, the VLR updates the UE's age based on the active timestamp. These new messages may be used to perform the VLR audit as described in at least FIG. 3.

In a second aspect of the proposed solution, unnecessary allocation of TMSI is addressed. In particular, current 3GPP specifications do not specify any different treatment of the SMS-only UEs in terms of Temporary Mobility Subscriber Identity (TMSI) allocation/reallocation when the serving VLR processes a SGsAP-Location-Update-Request message, which leads to the VLR to allocate a new TMSI to the SMS-only UE unnecessarily.

Figure 7:
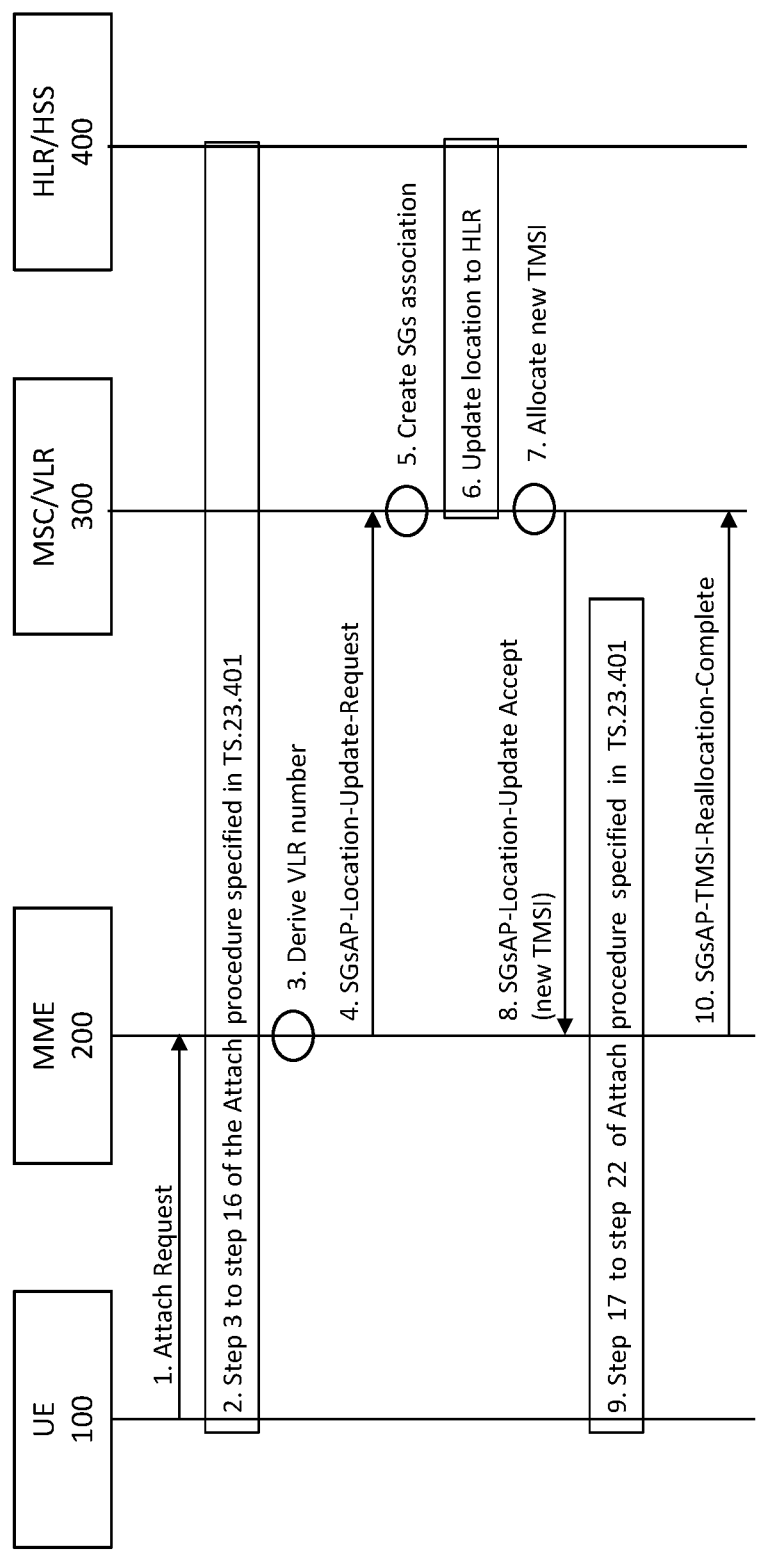
FIG. 7 illustrates a typical message flow of a combined attach procedure.

FIG. 7 illustrates a typical message flow of a combined attach procedure as provided in 3GPP TS23.401 (described in steps 1-10). A combined attach may be used by a UE 100 to attach to the network for both EPS and non-EPS services, or both EPS services and SMS-only service. In this message flow, the triggering message from the MME to the VLR is the SGsAP-Location-Update-Request message (3). The VLR then transmits Update Location (4) to the HLR if the UE is new to the VLR and/or if the VLR needs to get the data from the HLR. During the Attach procedure, at (7), the VLR allocates a TMSI for the subscriber.

In the current proposed solution, based on specific indicators (discussed below), the VLR does not allocate a new TMSI if it determines that the UE only uses the MSC for SMS services. To avoid allocating TMSI for an SMS-only UE with an SGs association, these specific indicators are checked by the serving VLR when it processes SGsAP-Location-Update-Request message. If the VLR finds out that the UE only uses the MSC for SMS services, it will not allocate a new TMSI for the subscriber during SGs location update. Then later during SMS termination, the VLR just includes the International Mobile Subscriber Identity (IMSI) in the SGsAP-Paging-Request message, i.e. a TMSI is not necessary. When the TMSI reallocation procedure is eliminated during SGs location update for an SMS-only subscriber/UE, SGs-TMSI-Reallocation-Complete message is also eliminated and hence the network traffic can be reduced and the combined Attach procedure can be finished faster.

Figure 8:
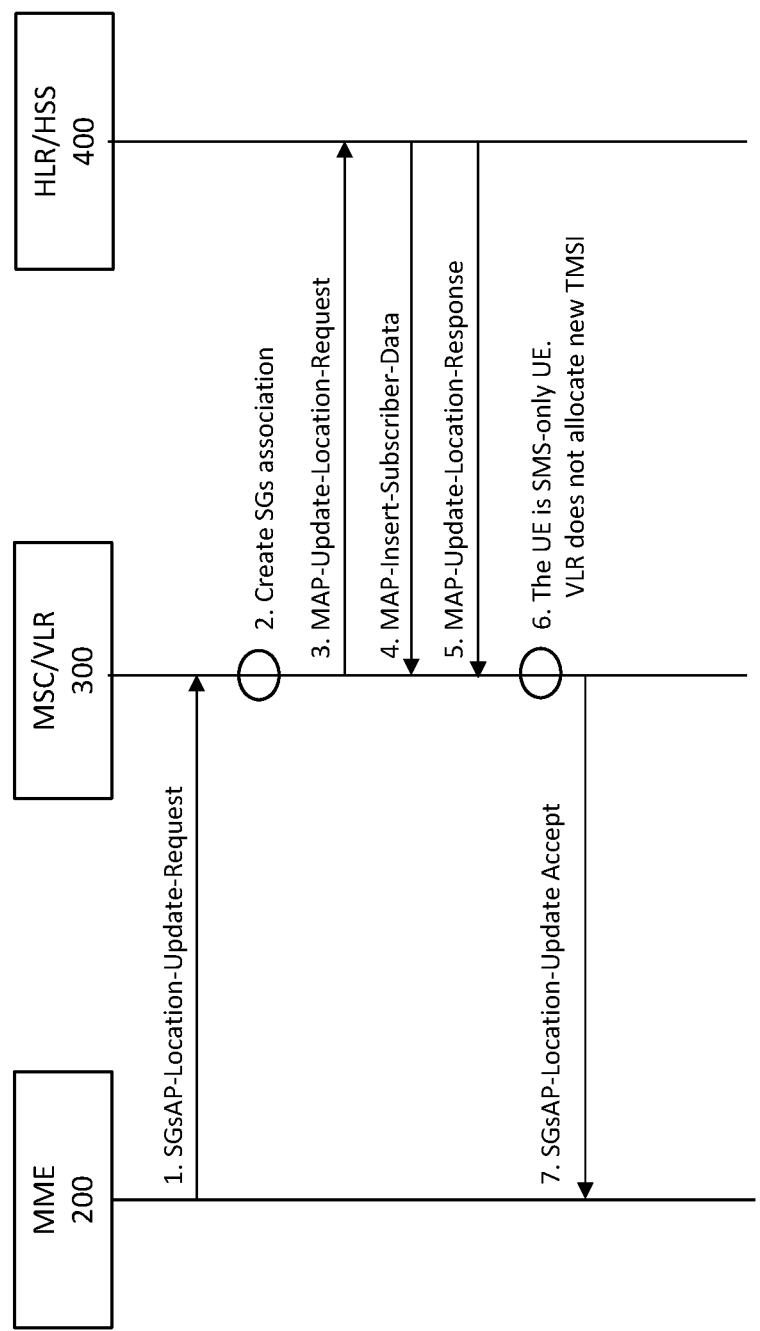
FIG. 8 depicts a modified message flow of an SGs Location Update according to the proposed solution.

FIG. 8 depicts a modified message flow of an SGs Location Update (steps 1-7) according to the proposed solution. For simplicity, only the messages between MME and MSC/VLR and between HLR and MSC/VLR are shown. In this embodiment, at step (6), the MSC/VLR checks if the UE performing the location update is an SMS-only UE. If so, the MSC/VLR does not allocate a TMSI and the MME does not send a SGsAP-TMSI-Reallocation-Complete (which, in contrast, these steps are required in the existing combined attach procedure shown in FIG. 7, steps 7 and 10).

In the following embodiments, the VLR may determine the UE is SMS-only, based on various specific indicators, and decide whether to perform TMSI allocation accordingly.

In a first embodiment, the MME may send a new SMS-Only indicator to the VLR in the SGsAP-Location-Update-Request message. Based on 3GPP 23.272, the UE may send an SMS-Only indicator to MME in the combined TA/LA update procedures. Thus, the MME knows if a UE uses MSC/VLR only for SMS services, and hence can further pass it to the VLR with a new information element (IE) in the SGsAP-Location-Update-Request message. Based on the new IE, VLR can determine if a UE is SMS-Only.

In a second embodiment, the VLR may can check the subscriber data from the Insert-Subscriber-Data (ISD) message from the HLR. If the subscriber is only provisioned with SMS service as indicated in the subscriber data, the VLR may assume that the UE is SMS-Only.

In a third embodiment, an operator may provision the capability/service category of a UE based on the IMSI ranges in the VLR. Based on this local provisioning data, the VLR/MSC may determine if a UE is SMS-only.

Figure 9:
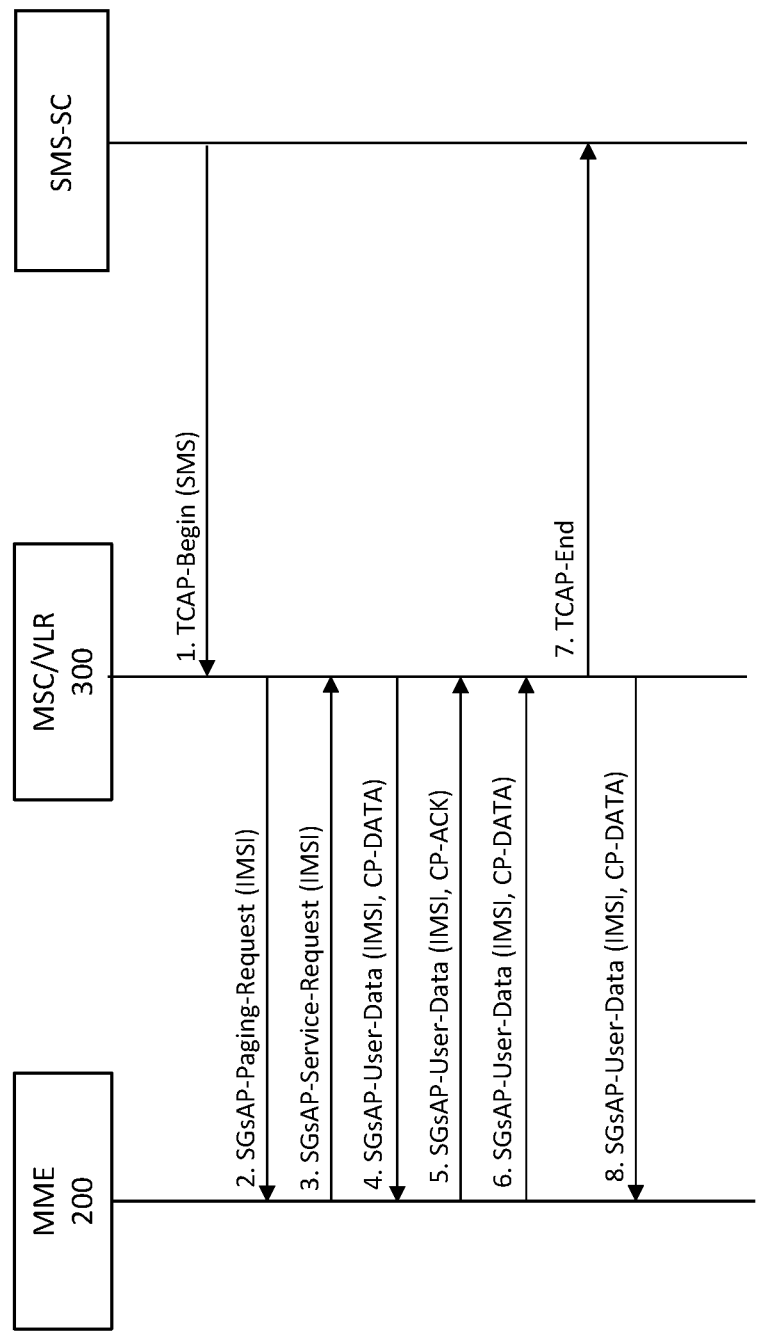
FIG. 9 depicts a message flow for SMS termination over the SGs interface according to the proposed solution.

After the VLR determines that the UE is SMS-only, the VLR does not allocate a TMSI for the UE during SGs location update. Further, when the VLR needs to page the UE for SMS termination, it does not include the TMSI IE in the SGsAP-Paging-Request message. FIG. 9 depicts a message flow for SMS termination over SGs according to the proposed solution. The key point in FIG. 9 is that in the SGsAP-Paging-Request message, TMSI IE is not included. It should be noted that, because the IMSI is always included in the SGsAP-Paging-Request message, not allocating TMSI for SMS-Only UE does not downgrade the protection of UE identity.

Figure 10A:
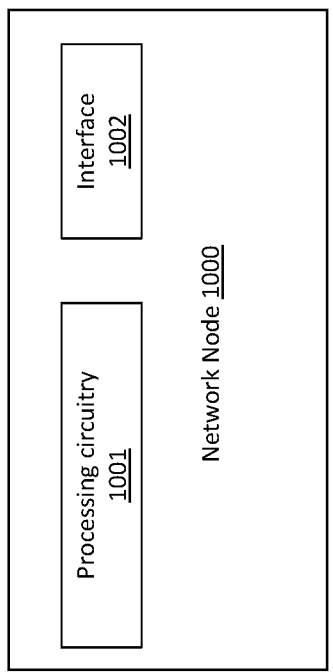
FIG. 10A-10C illustrate alternative embodiments of a network node according to the proposed VLR auditing methods.

An exemplifying embodiment of a network node, e.g. MSC/VLR or MME, is illustrated in a general manner in FIG. 10A. The network node 1000 is configured to perform at least one of the method embodiments described above, e.g. methods of FIGS. 2 to 6. The network node 1000 is associated with the same technical features, objects and advantages as previously described with respect to the method embodiments.

The network node may be implemented and/or described as follows:

The network node 1000 comprises processing circuitry 1001, and one or more communication interfaces 1002. For example, the communication interface 1002 may comprise one or more interfaces for transmitting one or more messages between network nodes, e.g. on the SGs interface between MME 200 and MSC/VLR 300, or interfaces for communication between the MME 200 or MSC/VLR 300 with HLR/HSS 400, as depicted in FIG. 1. The processing circuitry may be composed of one or more parts which may be comprised in one or more nodes in the communication network, but is here illustrated as one entity.

The processing circuitry 1001 is configured to cause the network node 1000, e.g. the MSC/VLR 300, to, when the age of a communication device's age in the VLR reaches or exceeds a first threshold, trigger a request to an MME 200 to notify the network node 1000 of a communication device's, e.g. UE's, activity. The processing circuitry 1001 is further configured to receive a notification from the MME indicating the communication device's activity and
update the communication device's aging information based on the notification.

Figure 10B:
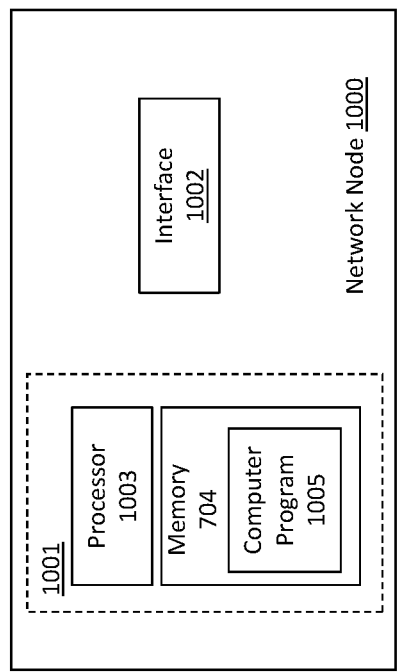

The processing circuitry 1001 may, as illustrated in FIG. 10B, comprise one or more processing means, such as a processor 1003, and a memory 1004 for storing or holding instructions, and/or subscriber data. In an embodiment of FIG. 10B, the memory may comprise instructions, e.g. in form of a computer program 1005, which when executed by the one or more processors 1003 causes the network node 1000 to perform the actions and methods described above, e.g. the methods of FIGS. 2 to 6.

Figure 10C:
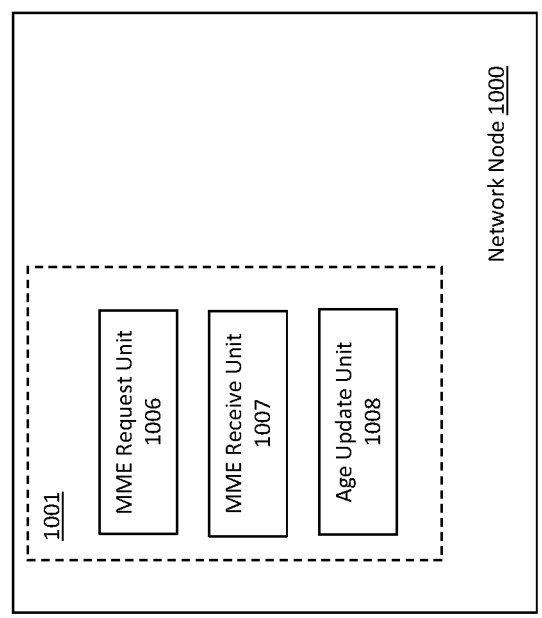

An alternative implementation of the processing circuitry 1001 is shown in FIG. 10C. The processing circuitry 1003 comprises a MME request unit 1006, configured to cause the network node, e.g. MSC/VLR 300, to, when the age of a communication device's age in the network node reaches or exceeds a first threshold, trigger a request to an MME 200 to notify the network node 1000 of a communication device's, e.g. UE's, activity. The processing circuitry 1003 further comprises a MME receive unit 1007 configured to receive a notification from the MME indicating the communication device's activity. The processing circuitry 1003 further comprises an age update unit 1008 configured to update the communication device's aging information based on the notification.

The steps, functions, procedures, modules, units and/or blocks described for the network node herein may be implemented in hardware using any conventional technology, such as discrete circuit or integrated circuit technology, including both general-purpose electronic circuitry and application-specific circuitry.

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or on a non-transitory computer readable storage medium before and/or during the use of the computer program e.g. in one or more nodes of the wireless communication network.

The flow diagram or diagrams presented herein may be regarded as a computer flow diagram or diagrams, when performed by one or more processors. A corresponding network node or apparatus may be defined as a group of function modules, where each step performed by a processor corresponds to a function module. In this case, the function modules are implemented as one or more computer programs running on one or more processors.

Examples of processing circuitry 1001 of a network node may include, but is not limited to, a combination of one or more of a microprocessor, controller, microcontroller, central processing unit (CPU), digital signal processor (DSP), application specific integrated circuit (ASIC), field programmable gate array (FPGA), Programmable Logic Controllers (PLCs), or any other suitable computing device, resource, or combination of hardware, software and/or encoded logic operable to provide, either alone or in conjunction with other components, such as memory 1004, the functionality of the network node 1000. That is, the units or modules in the arrangements in the communication network described above could be implemented by a combination of analog and digital circuits in one or more locations, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

The memory 1004 may comprise any form of volatile or non-volatile computer, or non-transitory computer readable media including, without limitation, persistent storage, solid state memory, remotely mounted memory, magnetic media, optical media, random access memory (RAM), read-only memory (ROM), removable media, or any other suitable local or remote memory component. Memory 1004 may store any suitable instructions, data or information, including software and encoded logic, to be executed by the processing circuitry 1001 so as to implement the above-described functionalities of the network node 1000. Memory 1004 may be used to store any calculations made by processor 1003 and/or any data received via interface. Memory 1004 may also be used to store subscriber data, including a communication device's age, whether a query has been sent to the MME to request the communication device's activity, and whether the communication device is delete-able.

It should also be understood that it may be possible to re-use the general processing capabilities of any conventional device or unit in which the specific proposed technology is implemented. It may also be possible to re-use existing software, e.g. by reprogramming of the existing software or by adding new software components in order to implement the specific features of the proposed technological solution.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

What is claimed is:

1. A method of auditing a Visitor Location Register (VLR) to manage communication device retention, the method comprising:
   determining, for a communication device, whether an age in the VLR of the communication device reaches or exceeds a first threshold;
   when the communication device's age in the VLR reaches or exceeds the first threshold, triggering a request to a Mobility Management Entity (MME) to notify the VLR of the communication device's activity;
   receiving a notification from the MME indicating the communication device's activity; and
   updating the communication device's aging information based on the notification.

2. The method of claim 1, wherein the communication device's activity comprises recently occurred activity or a next activity.

3. The method of claim 1, wherein updating the communication device's aging information based on the notification comprises:
   when the notification indicates activity associated with the communication device,
   updating the communication device's age to reflect the activity.

4. The method of claim 1, wherein the first threshold is an "Age-To-Query" threshold associated with the communication device.

5. The method of claim 1, the method further comprising:
   controlling the number of requests to the MME within an audit period.

6. The method of claim 1, wherein the communication device is an SGs-associated device.

7. The method of claim 1, wherein the request and notification are transmitted on an SGs interface.

8. A non-transitory computer readable medium comprising instructions, which when executed by a process, cause a network node to perform the method of claim 1.

9. The method of claim 1, wherein updating the communication device's aging information based on the notification comprises:
   when the notification indicates no activity for the communication device, not updating the communication device's age and letting communication device continue to age, and
   the method further comprising,
   when the communication device's age reaches or exceeds a second threshold, marking the communication device as delete-able.

10. The method of claim 9, the method further comprising:
    deleting the communication device marked delete-able to make room for new incoming communication devices.

11. The method of claim 9, wherein the second threshold is an "Age-To-Delete" threshold.

12. The method of claim 9, wherein the first threshold and the second threshold apply to one communication device, a range of communication devices, the type of device, or to all SGs-associated devices in the VLR.

13. The method of claim 9, wherein the first threshold and the second threshold are derived from provisioning based on at least one of: IMSI/IMEI default provisioning, runtime calculating, information received in a location update message, or information received in a message from the MME.

14. The method in claim 10, wherein deleting the communication device is further based on one or more of the following criteria: the communication device's age, whether the communication device is roaming or in its home network, whether the communication device is a regular priority or high priority device, and whether the communication device is detached or active.

15. A Visitor Location Register (VLR) for managing communication device retention configured to communicate with a Mobility Management Entity (MME) via an SGs interface, the VLR comprising:
processing circuitry comprising a memory and a processor, the memory in communication with the processor, and the memory having instructions that, when executed by the processor, cause the VLR to:
determine, for a communication device, whether an age in the VLR of the communication device reaches or exceeds an Age-To-Query threshold;
when the communication device's age in the VLR reaches or exceeds the Age-To-Query threshold, trigger a request to the MME to notify the VLR of the communication device's activity;
receive a notification from the MME indicating the communication device's activity; and
update the communication device's aging information based on the notification.

16. The VLR of claim 15, wherein the communication device's activity comprises recently occurred activity or a next activity.

17. The VLR of claim 15, further comprising instructions which when executed cause the VLR to:
when the notification indicates no activity for the communication device, not updating the communication device's age and letting communication device continue to age, and
when the communication device's age reaches or exceeds an Age-To-Delete threshold, mark the communication device as delete-able.

18. The VLR of claim 17, further comprising instructions which when executed cause the VLR to:
delete the communication device marked delete-able to make room for new incoming communication devices.

19. The VLR of claim 15, wherein the communication device is an SGs-associated device.

20. The VLR of claim 18, wherein deleting the communication device marked delete-able to make room for new incoming communication devices is further based on one or more of the following criteria: the communication device's age, whether the communication device is roaming or in its home network, whether the communication device is a regular priority or high priority device, and whether the communication device is detached or active.

21. The VLR of claim 15, further comprising instructions which when executed cause the VLR to:
control the number of requests to the MME within an audit period.

* * * * *